United States Patent

Monta et al.

[11] Patent Number: 5,298,995
[45] Date of Patent: Mar. 29, 1994

[54] APPARATUS FOR PROVIDING PROPER PLACEMENT AND SIZING OF SUBTITLES GIVEN THE CONVERSION OF THE IMAGE TO THAT OF A WIDER ASPECT RATIO

[75] Inventors: Hiroki Monta, Ibaraki; Ryuji Matsuura, Takatsuki, both of Japan

[73] Assignee: Matsushita Electric Industrial Co., Ltd., Osaka, Japan

[21] Appl. No.: 859,000

[22] Filed: Mar. 30, 1992

[30] Foreign Application Priority Data

Apr. 4, 1991 [JP] Japan .................. 3-071518

[51] Int. Cl.⁵ .................. H04N 7/01; H04N 11/20; H04N 5/278
[52] U.S. Cl. .................. 348/458; 348/589; 348/704
[58] Field of Search .................. 358/11, 140, 180, 183, 358/185, 188, 21 R, 160, 22, 464; H04N 5/44, 7/01, 11/20, 5/278

[56] References Cited

U.S. PATENT DOCUMENTS

| 4,672,445 | 6/1987 | Casey et al. | 358/140 |
| 4,882,625 | 11/1989 | Akiyama | 358/140 |
| 4,885,631 | 12/1989 | Fukinuki et al. | 358/11 |
| 5,029,006 | 7/1991 | Katsumata et al. | 358/180 |
| 5,170,253 | 12/1992 | Horiuchi et al. | 358/183 |
| 5,181,110 | 1/1993 | Katsumata et al. | 358/180 |

FOREIGN PATENT DOCUMENTS 4-245875 9/1992 Japan .

OTHER PUBLICATIONS

Sokawa, et al, "Digital Signal Processing System for EDTV Receivers," Proceedings of the 1990 ITE Annual Convention, pp. 339-340, The Institute of Television Engineers, Jul. 1990.

*Primary Examiner*—Mark R. Powell
*Assistant Examiner*—John W. Miller
*Attorney, Agent, or Firm*—Stevens, Davis, Miller & Mosher

[57] ABSTRACT

An image signal magnifying apparatus is provided with a subtitle processing circuit capable of automatically detecting subtitles and moving the detected subtitle to a lower portion of a picture screen of an image display unit, when an image signal of a movie or the like, displayed on a picture screen having an aspect ratio of 4 to 3, is magnified to a picture screen having an aspect ratio of 16 to 9. Improvement of image quality of the characters of the subtitles after magnification of the image and simplification of the subtitle processing operation are attained. An output of a subtitle processing circuit 6 and an output of a number-of-scanning-line conversion circuit 9 are combined by a combining circuit 8. The image signal magnified by the number-of-scanning-line conversion circuit 9 and a subtitle processing signal, which is not subjected to conversion of the number of scanning lines are combined, so that the image quality of the characters of the subtitle, in the case where the image is magnified, can be improved. Further, a control signal establishing circuit 7, for automatically generating control signals required for the subtitle processing operation is provided, so that simplification of the subtitle processing operation can be attained.

12 Claims, 8 Drawing Sheets

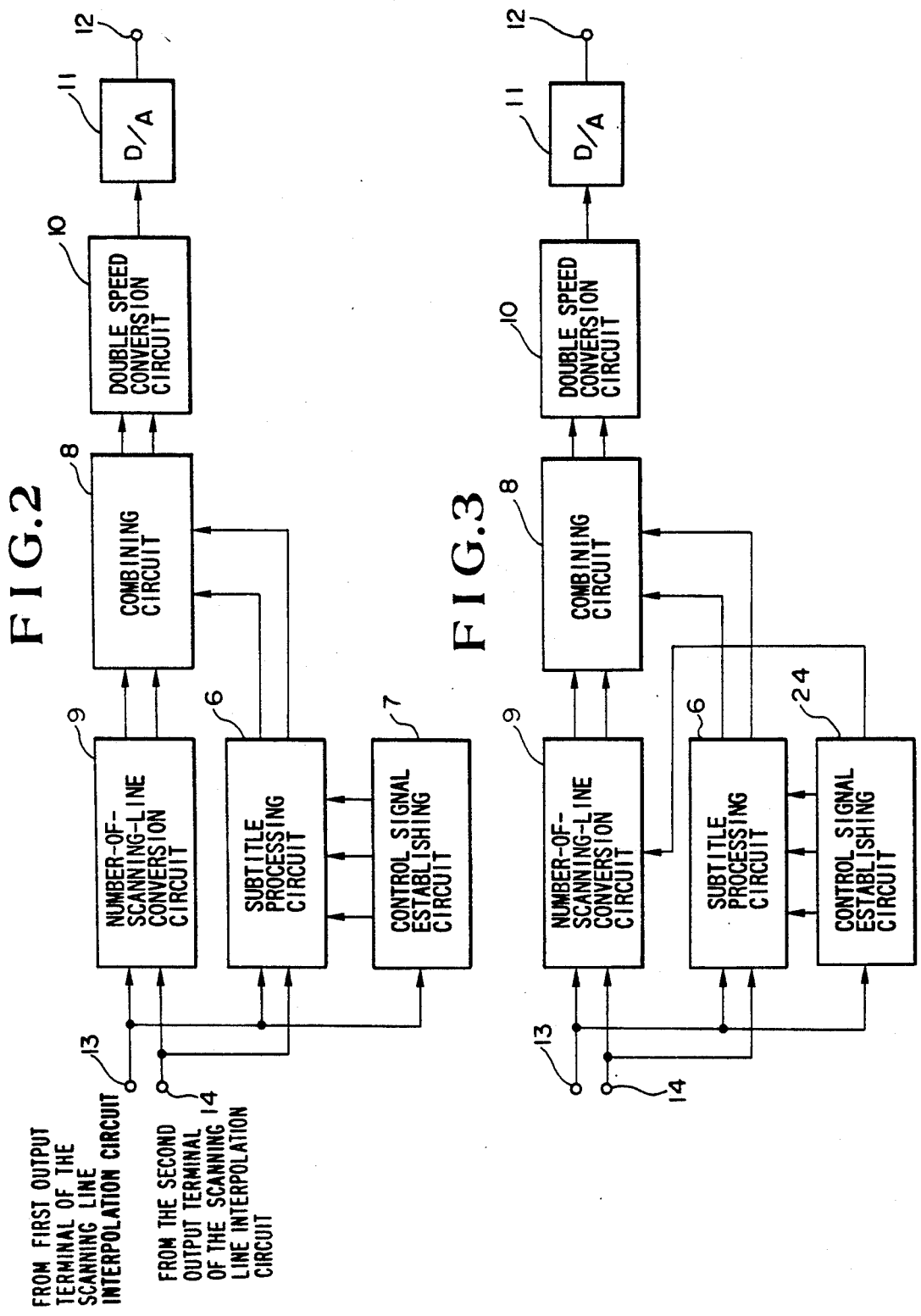

⇩ SUBTITLE PROCESSING SWITCH ON

↕ SUBTITLE DETECTION AREA

⇩ IMAGE MAGNIFICATION SWITCH ON

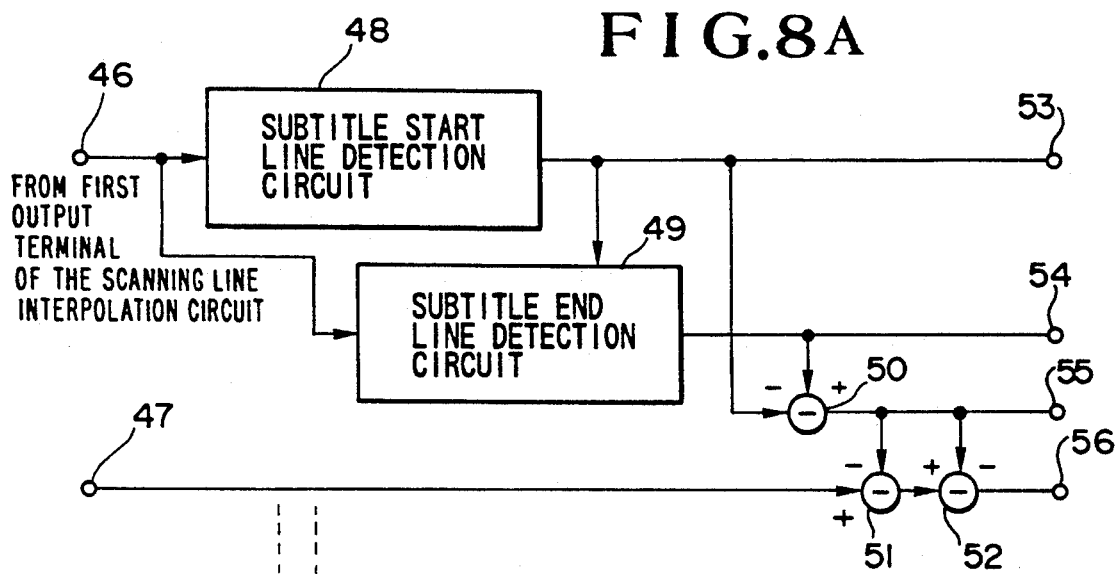
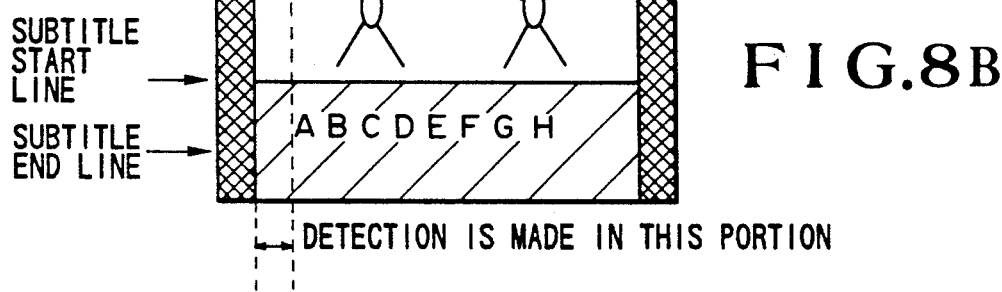
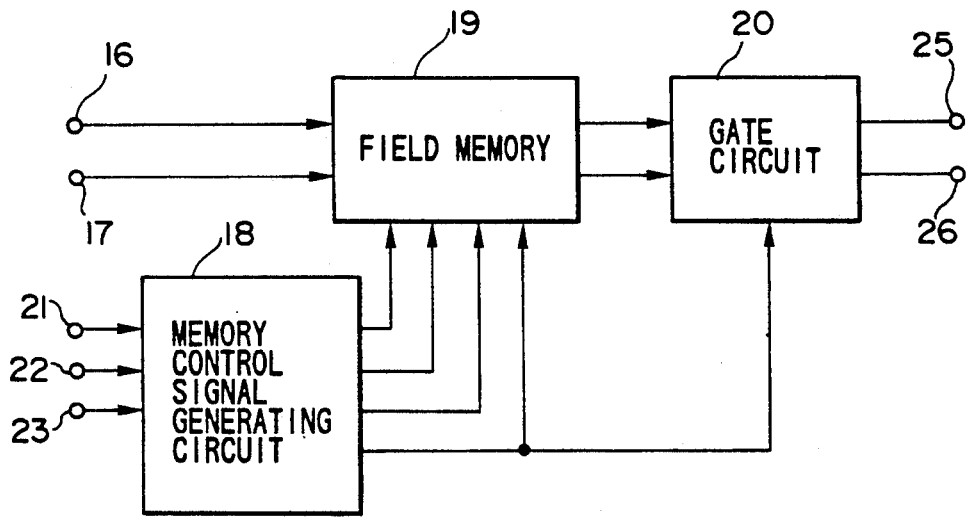

APPARATUS FOR PROVIDING PROPER PLACEMENT AND SIZING OF SUBTITLES GIVEN THE CONVERSION OF THE IMAGE TO THAT OF A WIDER ASPECT RATIO

BACKGROUND OF THE INVENTION

The present invention relates to an image signal magnifying apparatus capable of detecting missing subtitle which are lost when an image signal of letter box type, vista size, cinema size or the like, having missing upper and lower pictures, is magnified and displayed with an image display apparatus having an aspect ratio of 16 to 9 and the position of the subtitles is changed.

Recently, television receivers having large picture size are prevalent and it is also being considered to change the a picture screen of televisions to have a wide aspect ratio.

Further, video softwares (specifically, movie software) are sufficiently provided and an image magnifying apparatus which magnifies an image signal of letter box type, vista size, cinema size or the like, having missing upper and lower pictures, to a size corresponding to a picture screen with a wide aspect ratio (of 16 to 9, for example) to display the magnified image signal is commercially available. At this time, in a movie, after a subtitle processing has been made in which the subtitle is moved to an imaging unit to combine it with an image signal since the subtitle is lost, the image signal is magnified.

Referring now to the accompanying drawings, an example of an image magnifying apparatus provided with subtitle processing function used heretofore is described. FIG. 11 is a block diagram of an image magnifying apparatus provided with conventional subtitle processing function. In FIG. 11, numeral 13 denotes an input terminal for a current signal which is one output signal of a scanning line interpolation circuit 5 (refer to FIG. 1), 14 an input terminal for an interpolation signal which is the other output signal of the scanning line interpolation circuit 5, 6 a subtitle processing circuit, 41 an input terminal for a subtitle start line, 42 an input terminal for a subtitle end line, 43 an input terminal for the number of moving lines of the subtitle, 8 a combining circuit, 10 a double speed conversion circuit, 11 a D/A converter, 39 a image display unit, 40 a deflection pulse control circuit, 44 a horizontal synchronizing signal input terminal, and 45 a vertical synchronizing signal input terminal.

Operation of the image magnifying apparatus constructed above will now be described.

The subtitle processing circuit 6 detects a subtitle portion from the inputted current signal and the interpolation signal and moves the detected subtitle portion to a position determined by a user to combine the subtitle with an image signal. In this position, the subtitle signals detected from the current signal and the interpolation signal and the input image signal are combined in the combining circuit 8. The combined signal is converted at double speed and further converted from a digital signal into an analog signal. In the conventional method, the combined image signal is magnified by controlling a deflection pulse to display the image on the display unit 39.

FIG. 9 is a block diagram of the subtitle processing circuit 6. In FIG. 9, numeral 16 denotes an input terminal for the current signal, 17 an input terminal for the interpolation signal, 21 an input terminal of the subtitle start line, 22 an input terminal for the subtitle end line, 23 an input terminal of the number of moving lines of the subtitle, 18 a memory control signal generating circuit, 19 a field memory, 20 a gate circuit, 25 an output signal of a subtitle processing signal of the current signal, and 26 an output terminal of the subtitle processing signal of the interpolation signal. Operation of the circuit of FIG. 9 will now be described. The memory control signal generating circuit 18 generates a write enable pulse (WE signal) and a write reset pulse (RSTW signal) which are write control pulses for the field memory 19, on the basis of the start line and the end line for the subtitle inputted by the user. Then, the memory control signal generating circuit 18 generates a read enable pulse (RE signal) and a read reset pulse (RSTR signal), which are read pulses of the field memory 19, on the basis of the number of moving lines of the subtitle inputted by the user. Only the subtitle portions of the current signal and the interpolation signal are written in the field memory 19 and only the subtitle portions of the current signal and the interpolation signal are read from the field memory after delay of the number of moving lines designated by the user. The gate circuit 20 gates the output signals of the field memory 19 with the RE signal to nullify all of the signals to zero except the subtitle portion, so that the subtitle processing signals for the current signal and the interpolation signal are produced from the output terminals 25 and 26, respectively.

FIG. 10 is a block diagram of the combining circuit 8. In FIG. 10, numeral 27 denotes an input terminal of current line signal, 28 an input terminal of current line subtitle processing signal, 30 an input terminal of interpolation line signal, 31 an input terminal of interpolation line subtitle processing signal, 29 an input terminal of character detection pattern, 32 and 33 comparators, 34 and 35 switches, 36 an output terminal of current signal subtitle combining signal and 37 an output signal of interpolation signal subtitle processing signal. Operation of the circuit of FIG. 10 is now described.

The comparators 32 and 33 compare the subtitle processing signals and the character detection pattern to examine the magnitudes thereof. When the subtitle processing signals are larger than the character detection pattern, the comparators 32 and 33 produce O. When the subtitle processing signals are smaller, the comparators produce 1. The switches 34 and 35 effect switching of the image signal and the subtitle processing signal in response to the output signals of the comparators 32 and 33, to produce the subtitle combined signals of the current signal and the interpolation signal from the output terminals 36 and 37, respectively.

With the above configuration, however, there is a problem that since the magnification of image is made by controlling the deflection pulse, the density of scanning lines is coarse and characters of the subtitle are visually cut horizontally in a portion having no scanning line. Further, there is a problem in operability that the parameters required for the subtitle processing must be inputted by the user.

SUMMARY OF THE INVENTION

It is an object of the present invention to provide an image signal magnifying apparatus which improves image quality of characters of subtitle and simplifies operation by automatically establishing parameters required for subtitle processing.

In order to solve the above problems, the image signal magnifying apparatus of the present invention comprises an A/D converter connected to an image signal input terminal to convert an analog signal to a digital signal, a movement detection circuit connected to an output terminal of the A/D converter to detect movement of the image signal, a brightness signal separation circuit connected to the output terminal of the A/D converter and an output terminal of the movement detection circuit to separate a brightness signal from the image signal, a scanning line interpolation circuit connected to an output terminal of the brightness signal separation circuit and the output terminal of the movement detection circuit to interpolate a scanning line, a control signal establishing circuit connected to a first output terminal of the scanning line interpolation circuit to establish a subtitle processing control signal, a subtitle processing circuit connected to first to third output terminals of the control signal establishing circuit and to first and second output terminals of the scanning line interpolation circuit to extract subtitle from the image signal, a combining circuit connected to first and second output terminals of the subtitle processing circuit and to the first and second output terminals of the scanning line interpolation circuit to combine an interpolated signal of the scanning line with a subtitle extraction signal, a number-of-scanning-line conversion circuit connected to first and second output terminals of the combining circuit to magnify the image signal having the combined subtitle, a double speed conversion circuit connected to first and second output terminals of the number-of-scanning-line conversion circuit to combine two kinds of input signals into one kind of signal, and a D/A converter connected to an output terminal of the double speed conversion circuit to convert a digital signal into an analog signal.

Further, the second invention with respect to the above image signal magnifying apparatus comprises a current signal input terminal for inputting a signal produced from the first output terminal of the scanning line interpolation circuit, an interpolation signal input terminal for inputting a signal produced from the second output terminal of the scanning line interpolation circuit of the image signal magnifying circuit, the control signal establishing circuit connected to the current signal input terminal, the subtitle processing circuit connected to the first to third output terminals of the control signal establishing circuit, the current signal input terminal and the interpolation signal input terminal, the number-of-scanning-line conversion circuit connected to the current signal input terminal and the interpolation signal input terminal, and the combining circuit connected to the first and second output terminals of the number-of-scanning-line conversion circuit and the first and second output terminals of the subtitle processing circuit to combine the image signal magnified by conversion of the number of scanning lines with a subtitle processing signal which is not subjected to conversion of the number of scanning lines.

In the image signal magnifying apparatus of the second invention, a fourth output terminal of the control signal establishing circuit is connected to the number-of-scanning-line conversion circuit and the number of scanning lines is converted in accordance with the output signal of the control signal establishing circuit.

In order to automatically perform subtitle processing operation in the image signal magnifying apparatus, the control signal establishing circuit comprises a subtitle start line detection circuit connected to the first output terminal of the scanning line interpolation circuit to detect the start line of the subtitle, a subtitle end line detection circuit connected to the first output terminal of the scanning line interpolation circuit and the subtitle start line detection circuit to detect the end line of the subtitle, a first subtracter connected to an output terminal of the subtitle start line detection circuit and an output terminal of the subtitle end line detection circuit to calculate a difference between the start line and the end line of the subtitle to calculate a width of the subtitle, a number-of-effective-line input terminal for inputting the number of effective lines, a second subtracter connected to an output terminal of the first subtracter and the number-of-effective-line input terminal to calculate a difference between the number of effective lines and the width of the subtitle, a third subtracter connected to the output terminal of the first subtracter and an output terminal of the second subtracter to calculate an amount of movement of the subtitle, a subtitle start line output terminal connected to the output terminal of the subtitle start line detection circuit, a subtitle end line output terminal connected to the output terminal of the subtitle end line detection line, a subtitle movement amount output terminal connected to an output terminal of the third subtracter, and a subtitle width output terminal connected to the output terminal of the first subtracter.

Furthermore, in order to simplify the subtitle processing operation, there are provided means for automatically detecting the subtitle, means for displaying a result of the automatic detection of the subtitle in an image display unit, means for confirming the detection of the subtitle, means for automatically moving the subtitle, means for converting the number of scanning lines, means for displaying results of the automatic movement of the subtitle and the conversion of the number of scanning lines, means for confirming the subtitle processing control signal, and means for confirming the subtitle processing.

Magnification of the image signal is made by means of the number-of-scanning-line conversion method based on the digital technique, so that the number of scanning lines can be increased to high density to thereby eliminate deterioration of image quality of characters of the subtitle due to coarse density of the scanning lines. Further, combination of the image and the subtitle is made after the magnification of the image signal, so that deterioration of image quality of characters of the subtitle due to the number-of-scanning-line conversion method can be suppressed. In addition, the subtitle is moved and the image is magnified in a left portion of the picture screen, so that characters can be read easily.

Parameters required for the subtitle processing are automatically detected and a series of operations such as decision of the parameters for the detection, the movement and the processing of the subtitle and magnification of the image signal are made systematically, so that the subtitle processing operation can be simplified.

BRIEF DESCRIPTION OF THE DRAWINGS

FIG. 2 is a block diagram of an image signal magnifying apparatus according to a second embodiment of the present invention;

FIG. 3 is a block diagram of an image signal magnifying apparatus according to a third embodiment of the present invention;

FIGS. 8A and 8B schematically illustrate a control signal establishing circuit in a block diagram in the present invention and a display state;

FIG. 9 is a block diagram showing an actual example of a subtitle processing circuit;

DESCRIPTION OF THE PREFERRED EMBODIMENTS

Figure 1:
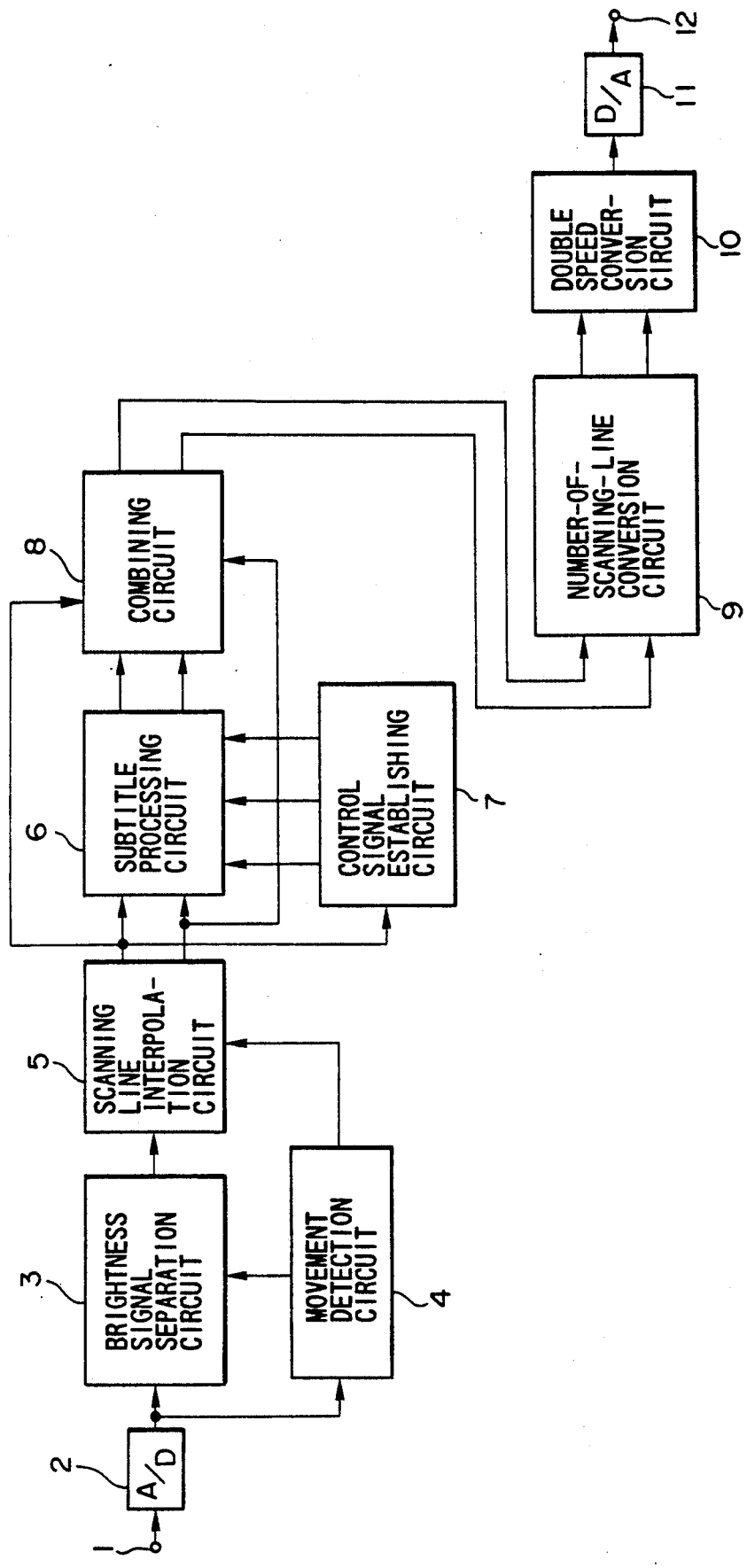
FIG. 1 is a block diagram of an image signal magnifying apparatus according to a first embodiment of the present invention.

An image signal magnifying apparatus according to an embodiment of the present invention is now described with reference to the accompanying drawings. FIG. 1 is a block diagram showing a circuit configuration of an image signal magnifying apparatus according to an embodiment of the present invention.

In FIG. 1, numeral 1 denotes an image signal input terminal, 2 an A/D converter connected to the image signal input terminal 1 to convert an analog signal to a digital signal, 4 a movement detection circuit connected to an output terminal of the A/D converter 2 to detect movement of the image signal, 3 a brightness separation circuit connected to the output terminal of the A/D converter 2 and an output terminal of the movement detection circuit 4 to separate a brightness signal from the image signal, 5 a scanning line interpolation circuit connected to an output terminal of the brightness signal separation circuit and the output terminal of the movement detection circuit 4 to interpolate scanning line, 7 a control signal establishing circuit connected to a first output terminal of the scanning line interpolation circuit 5 to establishing a control signal of the subtitle processing, 6 a subtitle processing circuit connected to first to third output terminals of the control signal establishing circuit 7 and first and second output terminals of the scanning line interpolation circuit 5 to extract the subtitle from the image signal, 8 a combining circuit connected to first and second output terminals of the subtitle processing circuit 6 and the first and second output terminals of the scanning line interpolation circuit 5 to combine the interpolated signal with respect to the scanning line with the subtitle extraction signal, 9 a number-of-scanning-line conversion circuit connected to first and second output terminals of the combining circuit 8 to magnify the image signal having the combined subtitle, 10 a double speed conversion circuit connected to first and second output terminals of the number-of-scanning-line conversion circuit 9 to combine two kinds of input signals to one kind of input signal, 11 a D/A converter connected to an output terminal of the double speed conversion circuit to convert a digital signal to an analog signal, and 12 an image signal output terminal connected to an output terminal of the D/A converter 11.

Operation of the image magnifying apparatus constructed above is now described.

The image signal inputted from the image signal input terminal 1 is converted by the A/D converter 2 into a digital data, from which a brightness (luminance) signal is separated by the brightness signal separation circuit 3. The separated brightness signal is interpolated with respect to the scanning line thereof by the scanning line interpolation circuit 5, which produces an interpolation signal and a current signal. The brightness signal separation process and the scanning line interpolation process are made by using the movement detection signal detected by the movement detection circuit 4 (refer to "DEVELOPMENT OF HIGH IMAGE QUALITY PROCESSING SYSTEM DEALING WITH CLEARVISON", Sokawa, Tokoi, Ishizu, Imai and Fujita, Annual Meeting of TV Society, 1990).

The current signal and the interpolation signal produced from the scanning line interpolation circuit 5 are subjected to the subtitle detection and movement processes on the basis of the output of the control signal establishing circuit 7 in the subtitle processing circuit 6 (FIG. 9) and the output signals of the subtitle processing circuit 6 are combined with the current signal and the interpolation signal produced from the combining circuit 8. The combined signal of the combining circuit is subjected to the conversion with respect to the number of the scanning lines in the number-of-scanning-line conversion circuit 9 and is further double speed converted in the double speed conversion circuit 10, of which an output signal is converted into an analog signal in the D/A converter 11 to be produced from the image signal output terminal.

Figure 4:
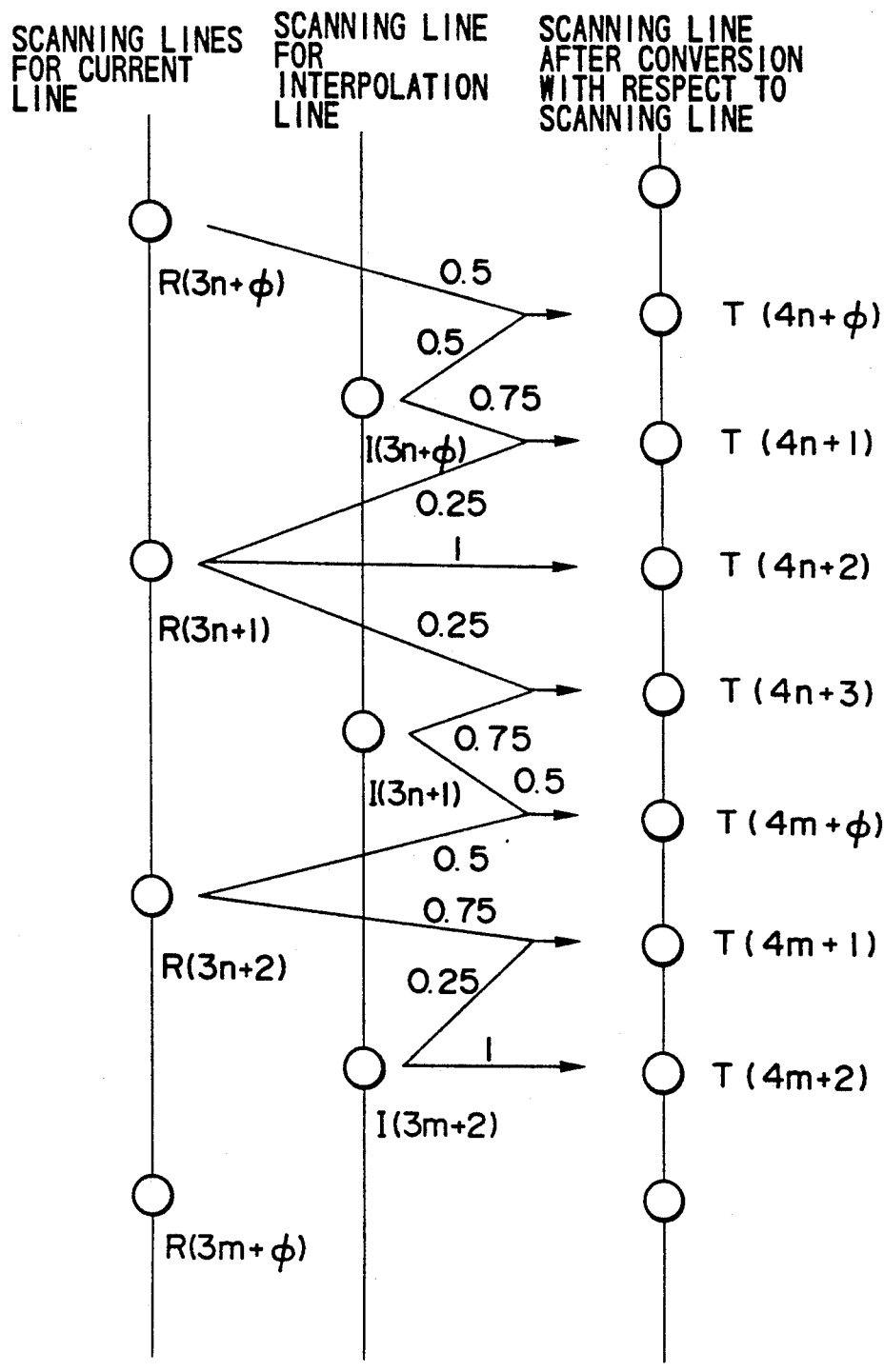
FIG. 4 is schematically illustrates an embodiment of a number-of-scanning-line conversion method.

FIG. 4 schematically illustrates an example of the conversion of the number of scanning lines. The conversion method of the number of scanning lines is now described with reference to FIG. 4. In FIG. 4, circle marks ◯ indicated in the leftmost column represent scanning lines of the current signal, and numbers in parentheses () following the letter R represent numbers of the scanning lines counted from the uppermost scanning line. Circle marks ◯ indicated in the middle column represent the scanning lines of the interpolation signals, and numbers in parentheses () following the letter I represent numbers of the scanning lines counted from the uppermost scanning line. Circle marks ◯ indicated in the rightmost column represent the-scanning lines of the output signal of the number-of-scanning-line conversion circuit 9, and numbers in parentheses () following the letter T represent numbers of the scanning lines counted from the uppermost scanning line. In FIG. 4, the scanning lines of the respective signals are multiplied by a coefficient weighted by a distance between the scanning line of the current signal and the scanning lines converted with respect to the number of scanning lines or the interpolation signal and the scanning line converted with respect to the number of scanning lines, to thereby perform the conversion operation with respect to the number of scanning lines, so that eight scanning lines T are formed by six scanning lines including three scanning lines R and three scanning lines I.

FIG. 8a is a block diagram of the control signal establishing circuit 7.

In FIG. 8, numeral 46 denotes a current signal input terminal, 48 a subtitle start line detection circuit, 49 a subtitle end line detection circuit, 47 an input terminal of the number of effective lines of the image, 50, 51 and 52 subtracters, 53 a subtitle start line output terminal, 54 a subtitle end line output terminal, 55 a subtitle width output terminal, and 56 an output terminal of the number of subtitle moving lines.

Operation of the control signal establishing circuit 7 constructed above is now described.

The subtitle start line detection circuit 48 detects a peak value at the left end portion of lines of an image signal (see FIG. 8b) by using a feature of a software of a movie or the like to thereby detect the start line. The subtitle end line detection circuit 49 also detects a peak value of lines at the left end portion of the image positioned below the subtitle start line in the same manner as the detection of the subtitle start line, to thereby detect and establish the end line. A width of the subtitle is calculated from a difference of the start line and the end line of the subtitle. That is, an output signal of the subtracter 50 represents the subtitle width. Further, a start line of the moved subtitle in the case where the subtitle is moved as lower as possible is calculated by a difference of the number of effective lines of the image (the number of lines of the picture screen) and the subtitle width. That is, the start line of the moved subtitle is obtained from an output signal of the subtracter 51. When the subtitle is combined before the conversion of the number of scanning lines, it is necessary to input the number of lines of the image which is not magnified, while the number of lines can be easily established by detecting a peak value of lines at the left end portion of the image. Further, the number of lines for moving the subtitle is defined by calculating a difference of the start line of the moved subtitle and the start line of the subtitle which is not moved. That is, the number of moving lines is obtained from an output signal of the subtracter 52.

In the configuration of FIG. 1, however, since the characters of the subtitle are also magnified by the number-of-scanning-line conversion circuit 9, the image quality of the characters is varied depending on the conversion method of the number of scanning lines and the image quality may be deteriorated in certain cases.

FIG. 2 is a block diagram of the image signal magnifying apparatus in which the characters of the subtitle are not converted with respect to the number of scanning lines.

In FIG. 2, numeral 13 denotes a current signal input terminal connected to the scanning line interpolation circuit 5 (see FIG. 1), 14 an interpolation signal input terminal connected to the scanning line interpolation circuit 5, 9 a number-of-scanning-line conversion circuit, 6 a subtitle processing circuit having input terminals connected to the current signal input terminal 13 and the interpolation signal input terminal 14 in the same manner as the input terminals of the number-of-scanning-line conversion circuit 9, 7 a control signal establishing circuit, 8 a combining circuit for combining output signals of the number-of-scanning-line circuit 9 with output signals of the subtitle processing circuit 6, 10 a double speed conversion circuit, 11 a D/A converter, and 12 an image signal output terminal.

Operation of the image signal magnifying apparatus constructed above is now described.

The subtitle processing circuit 6 performs the subtitle processing and the number-of-scanning-line conversion circuit 9 performs the conversion of the number of scanning lines. Output signals of the subtitle processing circuit 6 and output signals of the number-of-scanning-line conversion circuit 9 are combined in the combining circuit 8. The combined signal of the combining circuit 8 is converted at double speed in the double speed conversion circuit 10 and an output signal of the double speed conversion circuit 10 is converted into analog data to be produced from the image signal output terminal 12. With such a configuration, since only the image signal, not the characters of the subtitle is converted with respect to the number of scanning lines, the image quality of the characters is not deteriorated.

In the configuration of FIG. 2, when a brightness value of the characters is approximately equal to a brightness value of the image around the characters, a boundary between the characters and the image can not be distinguished.

FIG. 3 is a block diagram of an image magnifying apparatus in which the subtitle is moved to a portion of the picture screen positioned as lower as possible and the image is magnified in the picture screen left by movement of the subtitle.

In FIG. 3, numeral 13 denotes a current signal input terminal connected to the scanning line interpolation circuit 5 (see FIG. 1), 14 an interpolation signal input terminal connected to the scanning line interpolation circuit 5, a number-of-scanning-line conversion circuit 9, a subtitle processing circuit 6, a control signal establishing circuit 24, a combining circuit 8, a double speed conversion circuit 10, 11 a D/A converter, and 12 an image signal output terminal. The circuit of FIG. 3 is different from that of FIG. 2 in that the subtitle width output signal of the control signal establishing circuit 24 is applied to the number-of-scanning conversion circuit 9.

Operation of the image magnifying apparatus constructed above is now described.

The subtitle processing is the same as the above-described subtitle processing. The conversion process of the number of scanning lines performs the magnification of the image signal on the basis of the subtitle width output signal of the control signal establishing circuit 24 (see FIG. 8A). That is, a magnification factor of the imaging portion is defined in accordance with the subtitle width. The output signal of the subtitle processing circuit 6 and the output signal of the number-of-scanning-line conversion circuit 15 are combined by the combining circuit 8. The signal combined by the combining circuit 8 is increased to double speed by the double speed conversion circuit 10. The output signal of the double speed conversion circuit 10 is converted into an analog data by the D/A converter 11 and is produced from the image signal output terminal 12.

Figure 5A:
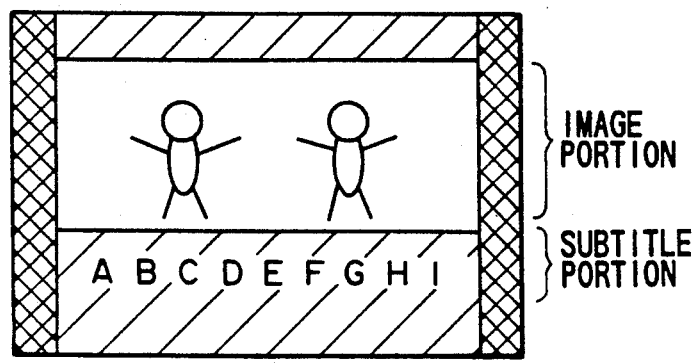
FIGS. 5A–5C schematically illustrate magnification of an image signal in the second and third embodiments.
Figure 5B:
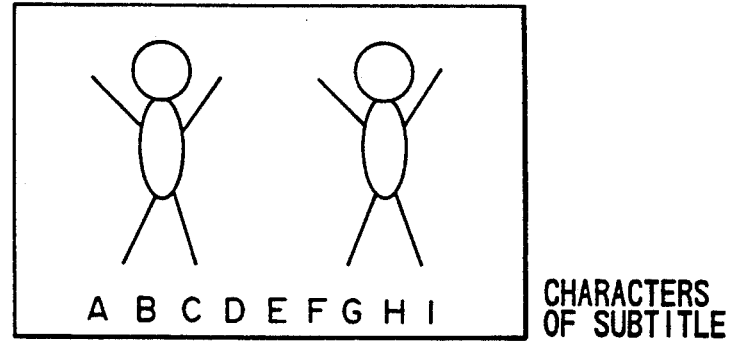
Figure 5C:
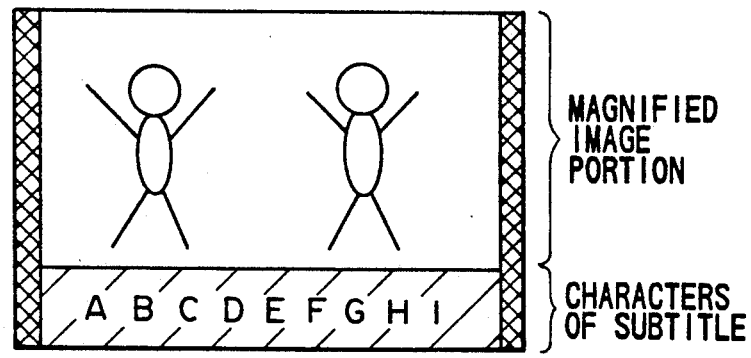

FIGS. 5A-C shows displayed states of results processed by the image magnifying apparatuses of the present invention shown in FIGS. 2 and 3, respectively (FIG. 5B shows the displayed state by the apparatus of FIG. 2 and FIG. 5C shows the displayed state by the apparatus of FIG. 3). It can be seen that the image can be magnified as shown in FIG. 5B and the subtitle can be read easily as shown in FIG. 5C. The characters of the same subtitle as that of the original image shown in FIG. 5A is reproduced and accordingly the image quality of the characters of the subtitle is not deteriorated.

Figure 6:
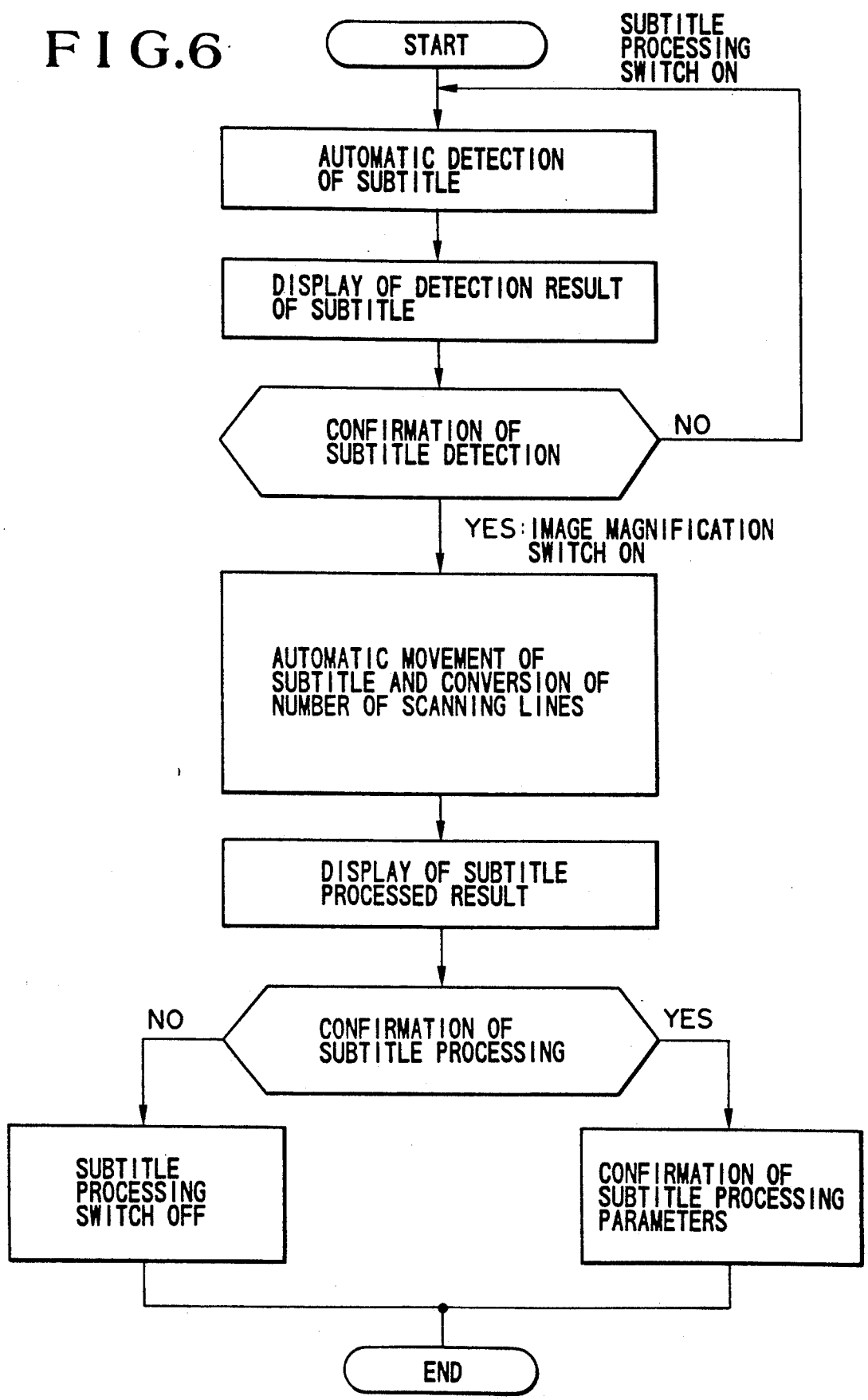
FIG. 6 is a flow chart of the image signal magnifying method in the present invention.

FIG. 6 is a flow chart showing the operation method of the image signal magnifying apparatus of the present invention.

The operation method of the image signal magnifying apparatus of the present invention is now described with reference to the flow chart shown in FIG. 6.

Figure 7A:
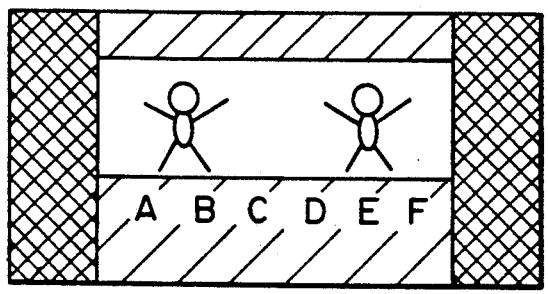
FIGS. 7A to 7D schematically illustrate the image signal magnifying method in the present invention.
Figure 7B:
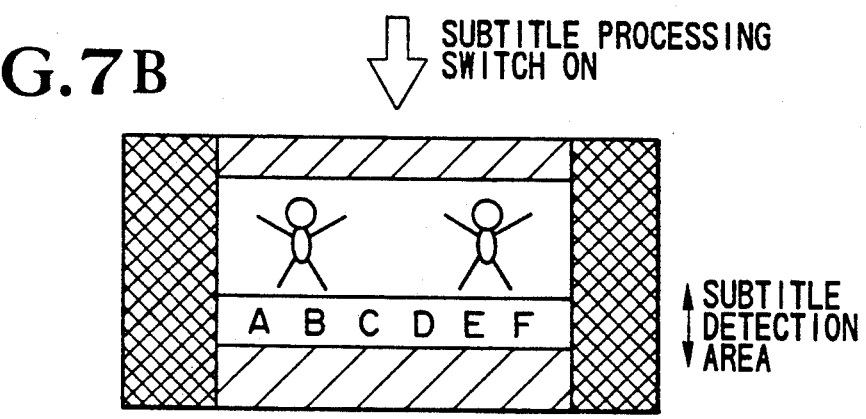
Figure 7C:
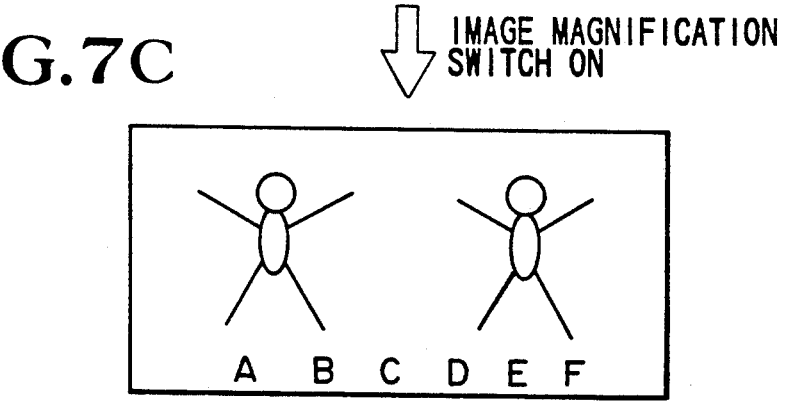
Figure 7D:
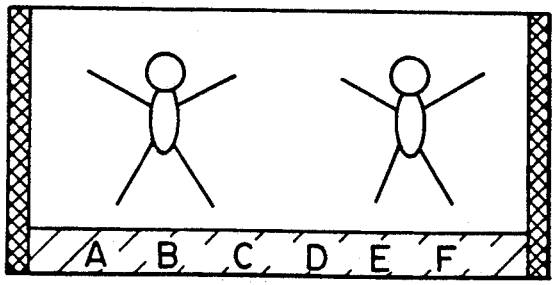
Figure 10:
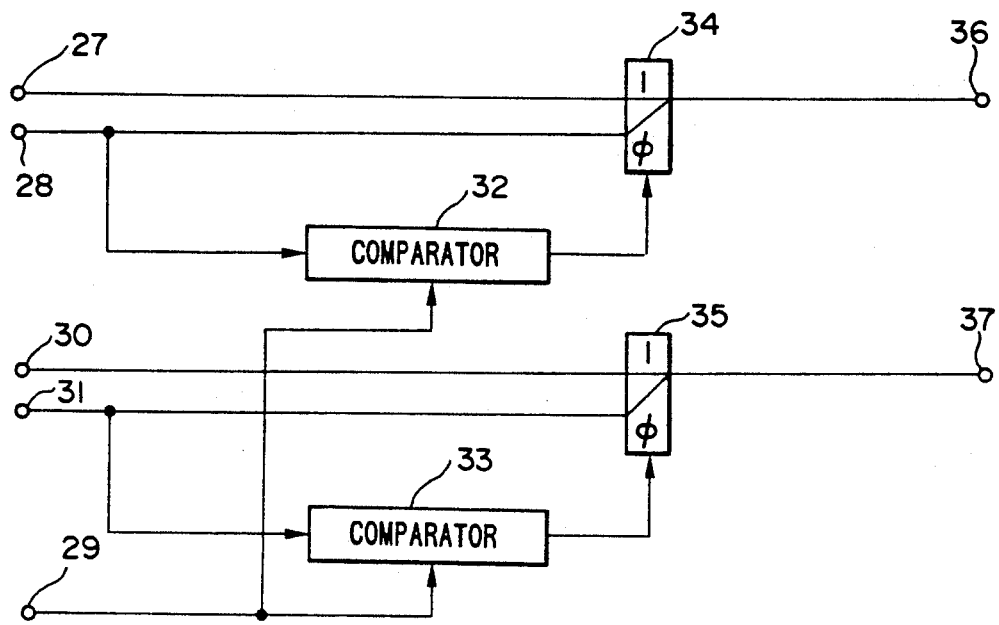
FIG. 10 is a block diagram showing an actual example of a combining circuit.
Figure 11:
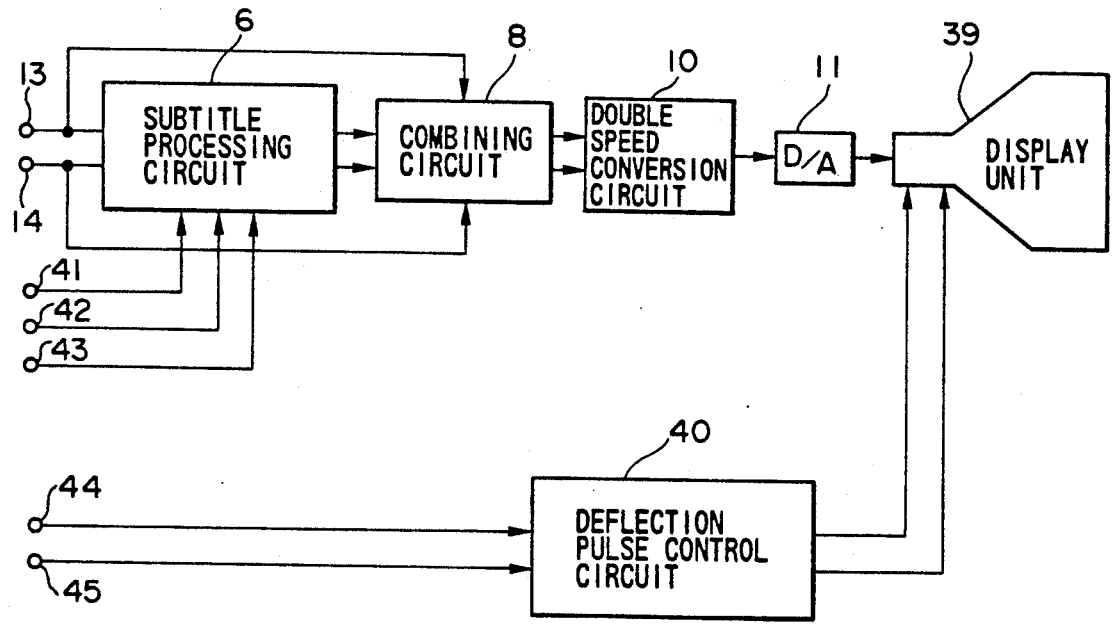
FIG. 11 is a block diagram showing a circuit configuration of a conventional image signal magnifying apparatus.

When a switch for performing the subtitle processing is turned on by the user, automatic detection of the subtitle is made and its detection result is displayed in the image display unit. The confirmation method of the detection result uses a method of coloring the detection portion as shown in FIG. 7B. Thus, the user can confirm the detection of the subtitle. Then, a switch for magnifying the image signal is turned on, so that decision of the subtitle processing parameter, movement of the subtitle and magnification of the image signal are performed. In this manner, in the operation method of the present invention, the automatic movement of the subtitle and the magnification of the image signal are made by two step operations to thereby simplifying the operability.

As described above, the image signal magnifying apparatus of the present invention comprises an A/D converter connected to an image signal input terminal to convert an analog signal to a digital signal, a movement detection circuit connected to an output terminal of the A/D digital signal to detect movement of the image signal, a brightness signal separation circuit connected to the output terminal of the A/D converter and an output terminal of the movement detection circuit to separate a brightness signal from the image signal, a scanning line interpolation circuit connected to an output terminal of the brightness signal separation circuit and the output terminal of the movement detection circuit to interpolate a scanning line, a control signal establishing circuit connected to a first output terminal of the scanning line interpolation circuit to establish a subtitle processing control signal, a subtitle processing circuit connected to first to third output terminals of the control signal establishing circuit and to first and second output terminals of the scanning line interpolation circuit to extract subtitle from the image signal, a combining circuit connected to first and second output terminals of the subtitle processing circuit and to the first and second output terminals of the scanning line interpolation circuit to combine an interpolated signal of the scanning line with a subtitle extraction signal, a number-of-scanning-line conversion circuit connected to first and second output terminals of the combining circuit to magnify the image signal having the combined subtitle, a double speed conversion circuit connected to first and second output terminals of the number-of-scanning-line conversion circuit to combine two kinds of input signals into one kind of signal, a D/A converter connected to an output terminal of the double speed conversion circuit to convert a digital signal into an analog signal, and an image signal output terminal connected to an output terminal of the D/A converter.

Further, in the image signal magnifying apparatus of the present invention, there are provided a current signal input terminal for inputting a signal produced from the first output terminal of the scanning line interpolation circuit, an interpolation signal input lo terminal for inputting a signal produced from the second output terminal of the scanning line interpolation circuit of the image signal magnifying circuit, the control signal establishing circuit connected to the current signal input terminal, the subtitle processing circuit connected to the first to third output terminals of the control signal establishing circuit, the current signal input terminal and the interpolation signal input terminal, the number-of-scanning-line conversion circuit connected to the current signal input terminal and the interpolation signal input terminal, and the combining circuit connected to the first and second output terminals of the number-of-scanning-line conversion circuit and the first and second output terminals of the subtitle processing circuit to combine the image signal magnified by conversion of the number of scanning lines with a subtitle processing signal which is not subjected to conversion of the number of scanning lines.

In addition, in the image signal magnifying apparatus of the present invention, a fourth output terminal of the control signal establishing circuit is connected to the number-of-scanning-line conversion circuit and the number of scanning lines is converted in accordance with the output signal of the control signal establishing circuit.

Furthermore, in the image signal magnifying apparatus of the present invention, in order to automatically perform subtitle processing operation, the control signal establishing circuit comprises a subtitle start line detection circuit connected to the first output terminal of the scanning line interpolation circuit to detect the start line of the subtitle, a subtitle end line detection circuit connected to the first output terminal of the scanning line interpolation circuit and the subtitle start line detection circuit to detect the end line of the subtitle, a first subtracter connected to an output terminal of the subtitle start line detection circuit and an output terminal of the subtitle end line detection circuit to calculate a difference between the start line and the end line of the subtitle to calculate a width of the subtitle, a number-of-effective-line input terminal for inputting the number of effective lines, a second subtracter connected to an output terminal of the first subtracter and the number-of-effective-line input terminal to calculate a difference between the number of effective lines and the width of the subtitle, a third subtracter connected to the output terminal of the first subtracter and an output terminal of the second subtracter to calculate an amount of movement of the subtitle, a subtitle start line output terminal connected to the output terminal of the subtitle start line detection circuit., a subtitle end line output terminal connected to the output terminal of the subtitle end line detection line, a subtitle movement amount output terminal connected to an output terminal of the third subtracter, and a subtitle width output terminal connected to the output terminal of the first subtracter.

Further, in order to simplify the subtitle processing operation, there are provided means for automatically detecting the subtitle, means for displaying a result of the automatic detection of the subtitle in an image display unit, means for confirming the detection of the subtitle, means for automatically moving the subtitle, means for converting the number of scanning lines, means for displaying results of the automatic movement of the subtitle and the conversion of the number of scanning lines, means for confirming the subtitle processing control signal, and means for confirming the subtitle processing.

With the provision of the above configuration, the image signal magnifying apparatus in which the image quality of the characters of the subtitle is not deteriorated and the subtitle processing and the magnification of the image signal are simplified can be provided.

We claim:
1. An image signal magnifying apparatus comprising:
   an image signal input terminal;
   an A/D converter, connected to said image signal input terminal, for converting an analog signal to a digital signal;

a movement detection circuit, connected to an output terminal of said A/D converter, for detecting movement of the image signal;

a brightness signal separation circuit, connected to the output terminal of said A/D converter and an output terminal of said movement detection circuit, for separating a brightness signal from the image signal;

a scanning line interpolation circuit, connected to an output terminal of said brightness signal separation circuit and the output terminal of said movement detection circuit, for interpolating scanning lines of said brightness signal;

a control signal establishing circuit, connected to a first output terminal of said scanning line interpolation circuit, for establishing a subtitle processing control signal;

a subtitle processing circuit, connected to first to third output terminals of said control signal establishing circuit and to first and second output terminals of said scanning line interpolation circuit, for extracting subtitle data from the image signal;

a combining circuit, connected to first and second output terminals of said subtitle processing circuit and to said first and second output terminals of said scanning line interpolation circuit, for combining an interpolated signal of the scanning lines with a subtitle extraction signal;

a number-of-scanning-line conversion circuit, connected to first and second output terminals of said combining circuit, for magnifying the image signal having said combined subtitle;

a double speed conversion circuit, connected to first and second output terminals of said number-of-scanning-line conversion circuit, for combining the outputs of said first and second output terminals of said number-of-scanning-line conversion circuit into one signal;

a D/A converter, connected to an output terminal of said double speed conversion circuit, for converting a digital signal into an analog signal; and an image signal output terminal connected to an output terminal of said D/A converter.

2. An image signal magnifying apparatus according to claim 1, wherein said control signal establishing circuit comprises:

a subtitle start line detection circuit, connected to the first output terminal of said scanning line interpolation circuit, for detecting a maximum brightness value in a left end area of the image signal of an image with a subtitle so as to automatically detect a start line of the subtitle;

a subtitle end line detection circuit, connected to the first output terminal of said scanning line interpolation circuit and said subtitle start line detection circuit, for automatically detecting the end line of the subtitle in the same manner as the subtitle start line detection circuit;

a first subtitle, connected to an output terminal of said subtitle start line detection circuit and an output terminal of said subtitle end line detection circuit, for calculating a difference between the start line and the end line of the subtitle so as to calculate a width of the subtitle;

a number-of-effective-line input terminal for inputting the number of effective lines;

a second subtracter, connected to an output terminal of said first subtracter and said number-of-effective-line input terminal, for calculating a difference between the number of effective lines and the width of the subtitle;

a third subtracter, connected to the output terminal of the first subtracter and an output terminal of the second subtracter, for calculating an amount of movement of the subtitle;

a subtitle start line output terminal, connected to the output terminal of said subtitle start line detection circuit;

a subtitle end line output terminal, connected to the output terminal of said subtitle end line detection line;

a subtitle movement amount output terminal, connected to an output terminal of said third subtracter; and a subtitle width output terminal, connected to the output terminal of said first subtracter.

3. An image signal magnifying apparatus comprising:

an image signal input terminal;

an A/D converter, connected to said image signal input terminal, for converting an analog signal into a digital signal;

a movement detection circuit, connected to an output terminal of said A/D converter, for detecting movement of the image signal;

a brightness signal separation circuit, connected to the output terminal of said A/D converter and an output terminal of said movement detection circuit, for separating a brightness signal from the image signal;

a scanning line interpolation circuit, connected to an output terminal of said brightness separation circuit and the output terminal of said movement detection circuit, for interpolating scanning lines of said brightness signal, said scanning line interpolation circuit including a current signal output terminal for outputting a current signal and an interpolation signal output terminal for outputting an interpolation signal;

a control signal establishing circuit, connected to said current signal output terminal, for establishing a subtitle processing control signal;

a subtitle processing circuit, connected to first to third output terminals of said control signal establishing circuit and said current signal output terminal and said interpolation signal output terminal, for extracting subtitle data from the image signal;

a number-of-scanning-line conversion circuit, connected to said current signal output terminal and said interpolation signal output terminal, for magnifying said image signal;

a combining circuit, connected to first and second output terminals of said number-of-scanning-line conversion circuit and first and second output terminals of said subtitle processing circuit, for combining the image signal magnified by said number-of-scanning-line conversion circuit with a subtitle processing signal which is output from said subtitle processing circuit and which has not been subjected to said number-of-scanning-line conversion circuit;

a double speed conversion circuit, connected to first and second output terminals of said combining circuit, for combining the outputs of said first and second output terminals of said combining circuit into one signal;

a D/A converter, connected to an output terminal of said double speed conversion circuit, for converting a digital signal into an analog signal; and an image signal output terminal connected to an output terminal of said D/A converter.

4. An image signal magnifying apparatus according to claim 3, wherein said number-of-scanning-line conversion circuit is connected to a fourth output terminal of said control signal establishing circuit and converts the number of scanning lines of the image signal in accordance with an output signal of said control signal establishing circuit.

5. An image signal magnifying apparatus according to claim 4, wherein said control signal establishing circuit comprises:

a subtitle start line detection circuit, connected to the current signal output terminal of said scanning line interpolation circuit, for detecting a maximum brightness value in a left end area of the image signal of an image with a subtitle so as to automatically detect a start line of the subtitle;

a subtitle end line detection circuit, connected to the current signal output terminal of said scanning line interpolation circuit and said subtitle start line detection circuit, for automatically detecting the end line of the subtitle in the same manner as the subtitle start line detection circuit;

a first subtracter, connected to an output terminal of said subtitle start line detection circuit and an output terminal of said subtitle end line detection circuit, for calculating a difference between the start line and the end line of the subtitle so as to calculate a width of the subtitle;

a number-of-effective-line input terminal for inputting the number of effective lines;

a second subtracter, connected to an output terminal of said first subtracter and said number-of-effective-line input terminal, for calculating a difference between the number of effective lines and the width of the subtitle;

a third subtracter, connected to the output terminal of the first subtracter and an output terminal of the second subtracter, for calculating an amount of movement of the subtitle;

a subtitle start line output terminal, connected to the output terminal of said subtitle start line detection circuit;

a subtitle end line output terminal, connected to the output terminal of said subtitle end line detection line;

a subtitle movement amount output terminal, connected to an output terminal of said third subtracter; and a subtitle width output terminal, connected to the output terminal of said first subtracter.

6. An image signal magnifying apparatus according to claim 3, wherein said control signal establishing circuit comprises:

a subtitle start line detection circuit, connected to the current signal output terminal of said scanning line interpolation circuit, for detecting a maximum brightness value in a left end area of the image signal of an image with a subtitle so as to automatically detect a start line of the subtitle;

a subtitle end line detection circuit, connected to the current signal output terminal of said scanning line interpolation circuit and said subtitle start line detection circuit, for automatically detecting the end line of the subtitle in the same manner as the subtitle start line detection circuit;

a first subtracter, connected to an output terminal of said subtitle start line detection circuit and an output terminal of said subtitle end line detection circuit, for calculating a difference between the start line and the end line of the subtitle so as to calculate a width of the subtitle;

a number-of-effective-line input terminal for inputting the number of effective lines;

a second subtracter, connected to an output terminal of said first subtracter and said number-of-effective-line input terminal, for calculating a difference between the number of effective lines and the width of the subtitle;

a third subtracter, connected to the output terminal of the first subtracter and an output terminal of the second subtracter, for calculating an amount of movement of the subtitle;

a subtitle start line output terminal, connected to the output terminal of said subtitle start line detection circuit;

a subtitle end line output terminal, connected to the output terminal of said subtitle end line detection line;

a subtitle movement amount output terminal, connected to an output terminal of said third subtracter; and a subtitle width output terminal, connected to the output terminal of said first subtracter.

7. An image signal magnifying apparatus comprising:

an image signal input terminal for receiving an analog image signal;

an A/D converter, connected to said image signal input terminal, for converting the analog image signal into a digital image signal;

a movement detection circuit, connected to an output terminal of said A/D converter, for detecting movement of the digital image signal;

a luminance signal separation circuit, connected to the output terminal of said A/D converter and an output terminal of said movement detection circuit, for separating a luminance signal from the digital image signal;

a scanning line interpolation circuit, connected to an output terminal of said luminance signal separation circuit and the output terminal of said movement detection circuit, for interpolating scanning lines in the luminance signal so as to obtain interpolated scanning lines, each of said interpolated scanning lines having a position between original scanning lines in the luminance signal, and for outputting an interpolated signal and a current signal;

a control signal establishing circuit for establishing at least one subtitle processing control signal on the basis of the luminance signal;

a subtitle processing circuit for extracting a subtitle from the current signal, including original scanning lines, and the interpolated signal, including interpolated scanning lines, in accordance with the at least one subtitle processing control signal;

a combining circuit for combining said subtitle with the current signal and the interpolated signal;

a number-of-scanning-line conversion circuit for converting a number of the original scanning lines and the interpolated scanning lines in the current and interpolated signals having said combined subtitle, so as to magnify the luminance signal;

a double speed conversion circuit for combining the original scanning lines and the interpolated scanning lines output from said number-of-scanning-line conversion circuit into a digital combined signal in a manner of double speed conversion;

a D/A converter, connected to an output terminal of said double speed conversion circuit, for converting said digital combined signal into an analog signal; and an image signal output terminal for outputting an analog luminance signal from said D/A converter.

8. An image signal magnifying apparatus according to claim 7, wherein said number-of-scanning-line conversion circuit converts the number of scanning lines in accordance with a signal which is obtained from said control establishing circuit and which indicates a width of the subtitle.

9. An image signal magnifying apparatus according to claim 8, wherein said control signal establishing circuit comprises:

a substitute start line detection circuit for receiving the luminance signal separated by said luminance signal separation circuit and detecting a maximum luminance value in a left end area of the luminance signal of a picture with a subtitle so as to automatically detect a start line of the subtitle;

a subtitle end line detection circuit for receiving the luminance signal separated by said luminance signal separation circuit and an output signal of said subtitle start line detection circuit and automatically detecting an end line of the subtitle in the same manner as the subtitle start line detection circuit;

a first subtracter for receiving the output signal of said subtitle start line detection circuit and an output signal of said subtitle end line detection circuit and calculating a difference between the start line and the end line of the subtitle so as to calculate a width of the subtitle;

a number-of-effective-line input terminal for inputting a number of effective lines;

a second subtracter, connected to an output terminal of said first subtracter and said number-of-effective-line input terminal, for calculating a difference between the number of effective lines and the width of the subtitle;

a third subtracter, connected to the output terminal of the first subtracter and an output terminal of the second subtracter, for calculating an amount of movement of the subtitle;

a subtitle start line output terminal for outputting the output signal of said subtitle start line detection circuit;

a subtitle end line output terminal for outputting the output signal of said subtitle end line detection circuit;

a subtitle movement amount output terminal for outputting an output signal of said third subtracter; and a subtitle width output terminal for outputting the output signal of said first subtracter.

10. An image signal magnifying apparatus according to claim 7, wherein said control signal establishing circuit comprises:

a substitute start line detection circuit for receiving the luminance signal separated by said luminance signal separation circuit and detecting a maximum luminance value in a left end area of the luminance signal of a picture with a subtitle so as to automatically detect a start line of the subtitle;

a subtitle end line detection circuit for receiving the luminance signal separated by said luminance signal separation circuit and an output signal of said subtitle start line detection circuit and automatically detecting an end line of the subtitle in the same manner as the subtitle start line detection circuit;

a first subtracter for receiving the output signal of said subtitle start line detection circuit and an output signal of said subtitle end line detection circuit and calculating a difference between the start line and the end line of the subtitle so as to calculate a width of the subtitle;

a number-of-effective-line input terminal for inputting a number of effective lines;

a second subtracter, connected to an output terminal of said first subtracter and said number-of-effective-line input terminal, for calculating a difference between the number of effective lines and the width of the subtitle;

a third subtracter, connected to the output terminal of the first subtracter and an output terminal of the second subtracter, for calculating an amount of movement of the subtitle;

a subtitle start line output terminal for outputting the output signal of said start line detection circuit;

a subtitle end line output terminal for outputting the output signal of said subtitle end line detection circuit;

a subtitle movement amount output terminal for outputting an output signal of said third subtracter; and a subtitle width output terminal for outputting the output signal of said first subtracter.

11. An image signal magnifying apparatus comprising:

an image signal input terminal for receiving an analog image signal;

an A/D converter, connected to said image signal input terminal, for converting the analog image signal into a digital image signal;

a movement detection circuit, connected to an output terminal of said A/D converter, for detecting movement of the digital image signal;

a luminance signal separation circuit, connected to the output terminal of said A/D converter and an output terminal of said movement detection circuit, for separating a luminance signal from the digital image signal;

a scanning line interpolation circuit, connected to an output terminal of said luminance signal separation circuit and the output terminal of said movement detection circuit, for interpolating scanning lines in the luminance signal so as to obtain interpolated scanning lines, each of said interpolated scanning lines having a position between original scanning lines in the luminance signal, and for outputting an interpolated signal and a current signal;

a control signal establishing circuit for establishing at least one subtitle processing control signal on the basis of the luminance signal;

a subtitle processing circuit for extracting a subtitle from the current signal, including original scanning lines, and the interpolated signal, including interpolated scanning lines, in accordance with the at least one subtitle processing control signal;

a number-of-scanning-line conversion circuit for converting a number of the original scanning lines and the interpolated scanning lines so as to magnify the luminance signal;

a combining circuit for combining said subtitle, which is not subjected to conversion of the number of scanning lines, with the luminance signal magnified by said number-of-scanning-line conversion circuit;

a double speed conversion circuit for combining the original scanning lines and the interpolated scanning lines outputs from said combining circuit into a combined digital signal by performing a double speed conversion operation;

a D/A converter, connected to an output terminal of said double speed conversion circuit, for converting said digital combined signal into an analog signal; and an image signal output terminal for outputting the luminance signal from said D/A converter.

12. An image signal magnifying apparatus according to claim 11, wherein said control signal establishing circuit comprises:

a substitute start line detection circuit for receiving the luminance signal separated by said luminance signal separation circuit and detecting a maximum luminance value in a left end area of the luminance signal of a picture with a subtitle so as to automatically detect a start line of the subtitle;

a subtitle end line detection circuit for receiving the luminance signal separated by said luminance signal separation circuit and an output signal of said subtitle start line detection circuit and for automatically detecting an end line of the subtitle in the same manner as the subtitle start line detection circuit;

a first subtracter for receiving the output signal of said subtitle start line detection circuit and an output signal of said subtitle end line detection circuit and calculating a difference between the start line and the end line of the subtitle so as to calculate a width of the subtitle;

a number-of-effective-line input terminal for inputting a number of effective lines;

a second subtracter, connected to an output terminal of said first subtracter and said number-of-effective-line input terminal, for calculating a difference between the number of effective lines and the width of the subtitle;

a third subtracter, connected to the output terminal of the first subtracter and an output terminal of the second subtracter, for calculating an amount of movement of the subtitle;

a subtitle start line output terminal for outputting the output signal of said subtitle start line detection circuit;

a subtitle end line output terminal for outputting the output signal of said subtitle end line detection circuit;

a subtitle movement amount output terminal for outputting an output signal of said third subtracter; and a subtitle width output terminal for outputting the output signal of said first subtracter.

* * * * *